(12) United States Patent
Scolaro

(10) Patent No.: US 11,180,266 B2
(45) Date of Patent: Nov. 23, 2021

(54) DEVICE FOR VACUUM PACKAGING, PARTICULARLY OF FOOD PRODUCTS

(71) Applicants: BLU PACK DI SCOLARO MAURO, Cernusco sul Naviglio (IT); EXTRU SA, Uharte-Arakil (ES)

(72) Inventor: Mauro Scolaro, Cernusco sul Naviglio (IT)

(73) Assignees: MACHSOLUTIONS SA, Mendrisio (CH); DAVINCHY SRL, La Altagracia (DO)

( * ) Notice: Subject to any disclaimer, the term of this patent is extended or adjusted under 35 U.S.C. 154(b) by 168 days.

(21) Appl. No.: 15/887,510

(22) Filed: Feb. 2, 2018

(65) Prior Publication Data

US 2018/0155072 A1    Jun. 7, 2018

Related U.S. Application Data

(62) Division of application No. 13/993,611, filed as application No. PCT/IB2011/055606 on Dec. 12, 2011, now Pat. No. 9,919,819.

(30) Foreign Application Priority Data

Dec. 13, 2010 (IT) .............................. TV2010A00164

(51) Int. Cl.
*B65B 7/16* (2006.01)
*B65B 7/28* (2006.01)
(Continued)

(52) U.S. Cl.
CPC ............ *B65B 7/2878* (2013.01); *B29C 65/18* (2013.01); *B29C 65/749* (2013.01);
(Continued)

(58) Field of Classification Search
CPC ..... B65B 7/164; B65B 7/2878; B65B 31/028; B65B 51/22; B65B 51/14
(Continued)

(56) References Cited

U.S. PATENT DOCUMENTS 3,190,051 A * 6/1965 Souligney ............... B29C 65/18
                                                                53/471
3,488,472 A * 1/1970 Pizarro ............ B29C 66/53461
                                                                219/243
(Continued)

FOREIGN PATENT DOCUMENTS

CN          87107865        5/1988
CN          1290225         4/2001
(Continued)

OTHER PUBLICATIONS

Reasons of Refusal from corresponding Japanese Patent Appl. No. 2013-543935. dated Aug. 4, 2015.
(Continued)

*Primary Examiner* — Thanh K Truong
*Assistant Examiner* — Patrick B Fry
(74) *Attorney, Agent, or Firm* — Ferguson Case Orr Paterson

(57) ABSTRACT

A packaging device, particularly for packaging trays containing food products or technical materials in a controlled atmosphere and by means of a film of plastic material, comprising an upper chamber and a lower chamber, which can be fastened by mutually superimposing them and are each provided internally with a plurality of heat-sealing and/or cutting and/or die-cutting elements arranged concentrically, the lower chamber being provided centrally with a plurality of supporting elements for a tray.

25 Claims, 11 Drawing Sheets

(51) Int. Cl.
- B65B 31/02 (2006.01)
- B65B 51/14 (2006.01)
- B65B 57/08 (2006.01)
- B65B 59/00 (2006.01)
- B65B 59/02 (2006.01)
- B29C 65/18 (2006.01)
- B29C 65/74 (2006.01)
- B29C 65/00 (2006.01)
- B29L 31/00 (2006.01)

(52) U.S. Cl.
CPC ...... *B29C 65/7451* (2013.01); *B29C 65/7461* (2013.01); *B29C 66/0014* (2013.01); *B29C 66/112* (2013.01); *B29C 66/131* (2013.01); *B29C 66/53461* (2013.01); *B29C 66/81463* (2013.01); *B29C 66/83221* (2013.01); *B29C 66/849* (2013.01); *B29C 66/8412* (2013.01); *B29C 66/84121* (2013.01); *B65B 7/164* (2013.01); *B65B 31/028* (2013.01); *B65B 51/14* (2013.01); *B65B 57/08* (2013.01); *B65B 59/02* (2013.01); *B29L 2031/712* (2013.01); *B65B 59/003* (2019.05); *B65B 2210/02* (2013.01)

(58) Field of Classification Search
USPC .............................. 53/257, 477, 201, 329.3
See application file for complete search history.

(56) References Cited

U.S. PATENT DOCUMENTS

| | | | | |
|---|---|---|---|---|
| 5,534,282 A | * | 7/1996 | Garwood | B65B 31/028 |
| | | | | 426/396 |
| 5,718,101 A | * | 2/1998 | Noel | B65B 7/164 |
| | | | | 53/300 |
| 7,269,932 B2 | * | 9/2007 | Konishi | B65B 7/164 |
| | | | | 53/329.4 |
| 7,600,358 B2 | * | 10/2009 | Natterer | B65B 7/164 |
| | | | | 53/432 |
| 8,381,497 B2 | | 2/2013 | Scheibel | |
| 9,073,656 B2 | * | 7/2015 | Mader | B65B 7/162 |
| 9,150,316 B2 | | 10/2015 | Vaccari | |
| 2005/0257501 A1 | | 11/2005 | Natterer | |
| 2009/0049804 A1 | * | 2/2009 | Choi | B65B 7/2878 |
| | | | | 53/477 |
| 2011/0072764 A1 | | 3/2011 | Daniek | |
| 2016/0304226 A1 | | 10/2016 | Rossini | |

FOREIGN PATENT DOCUMENTS

| | | |
|---|---|---|
| DE | 10237933 | 2/2004 |
| EP | 0603704 | 6/1994 |
| EP | 0832819 | 4/1998 |
| FR | 2178765 | 11/1973 |
| FR | 2680152 | 2/1993 |
| JP | S4978364 | 7/1974 |
| JP | S56131117 | 10/1981 |
| JP | 2000318709 | 11/2000 |
| JP | 2005535535 | 11/2005 |
| WO | 9103400 | 3/1991 |
| WO | 9746447 | 12/1997 |

OTHER PUBLICATIONS

International Search Report and Written Opinion for PCT/IB2011/055606, dated Mar. 14, 2012.

Italian Search Report for TV2010A00164 dated Jul. 21, 2011.

First Office Action from corresponding Chinese Patent Appl. No. 201180060009.6, dated Apr. 18, 2014.

* cited by examiner

DEVICE FOR VACUUM PACKAGING, PARTICULARLY OF FOOD PRODUCTS

This application is a divisional application of Ser. No. 13/993,611 to Scolaro, filed on Jun. 12, 2013, which is the U.S. national phase of PCT Application No. PCT/IB2011/055606 filed on Dec. 12, 2011, which claims priority to Italian Patent Application No. TV2010A000164 filed on Dec. 13, 2010, the disclosures of which are incorporated in their entirety by reference herein.

TECHNICAL FIELD

The present invention relates to a packaging device, particularly for food products or technical materials.

BACKGROUND ART

Vacuum machines are currently known which have a bell-shaped chamber and comprise a vacuum pump which is connected to a chamber, also known as vacuum chamber, inside which there is usually a preformed pouch, which is open on three sides and inside which a food product is placed.

In these machines of the known type, the preformed pouch, with the product already inside, is then inserted in the vacuum chamber and then vacuum is produced inside the chamber; a heat seal is then provided at the free side of the preformed pouch.

This known technology entails the need to use preformed pouches which therefore have a size that can be compared to that of the product. Moreover, considerable labor is required.

Operating steps therefore occur which increase the time required to achieve vacuum packaging of the product. Furthermore, if packaging occurs in a controlled atmosphere, a large proportion of the gas is wasted, since the gas is dispersed not only into the pouch but mostly also inside the vacuum chamber.

EP603704 is also known in which food products are packaged by using a film of plastic material which is guided through a folding station in order to obtain a double layer and is then heat-sealed so as to define pouches.

These pouches are obtained in the desired size or capacity before being filled and sealed.

Heat-sealing and forming are followed by filling, as well as by the closing and cutting of the pockets or pouches thus obtained. However, this solution is complicated, in that it has multiple and distinct stations for performing the individual operations to which the film of plastic material must be subjected in sequence.

Furthermore, hot or cold forming of the plastic film is provided, and so is the filling, by means of a nozzle, with liquid products, flours or finely granulated products, and therefore it is not possible to consider the use of the described solution for solid products having preset volumes, such as sliced ham and salami, meat, cheese in portions, trays containing food and nonfood products.

Moreover, in the described known solution, in order to achieve closure of the pocket or pouch it is necessary to pass it through various steps of operation, with the consequent need for optimum centering of the pouch at each station so as to allow optimum and desired processing.

EPA0405718 is also known which illustrates a solution for a packaging device, particularly for packaging food products or technical materials that can be inserted between longitudinally folded parts of a single-folded film from one of its open sides. The device comprises thermal bonding means or heat-sealing means which are substantially L-shaped so as to seal the film both at the open longitudinal side and at its transverse sides, and at least one nozzle for generating vacuum and/or for introducing the gas or mixture.

EP0832819B1 is also known which has, as its priority, Italian application AL960002 dated 26, Sep., 1996, which describes a packaging device which comprises a vacuum chamber which can be opened to receive a length of at least one single-folded film with the material to be packaged inserted therein, and respectively can be closed hermetically, after which it is possible to produce vacuum and/or introduce the gas or mixture with the portion or length of film assuming a pocket-like configuration, heat-sealing means being furthermore provided which are arranged for operation within the vacuum chamber, the at least one nozzle being arranged at the vacuum chamber so as to be directed, after its closure, toward the open longitudinal and/or transverse sides of the length of film.

This solution, too, is not free from drawbacks, since the forming of micro-creases has been observed during the heat-sealing of the film, and this can entail problems in tightness and worsens the aesthetic appearance of the package.

Furthermore, the flow of the gas inside the film is not optimum, reducing the efficiency of the device.

Finally, when the operator pulls the sheet, the sheet can assume an incorrect arrangement.

Another problem is also noted: when vacuum is provided in a bell, and accordingly in the pouch being formed, it is then necessary to compensate the vacuum partially with the gas; however, if the compensation is excessive, the bell opens during heat-sealing.

Since one works with a system in a particularly variable equilibrium, there is no precise control over the volume of gas introduced in the bag or pouch being formed.

The quantity, both in absolute terms and in relative terms (%), of gas that remains inside the pouch being formed is therefore extremely variable and difficult to control, and this leads to the provision of a series of pouches or packages which are more or less inflated or deflated depending on the situation.

The problem is then worsened if it is necessary to change package format often.

Another problem is observed in the step of heat-sealing of the film, which is heat-sealed and cut on the transverse side with respect to the direction of advancement of the film: since it is often made of heat-shrinking material, the film can retract, reducing its width, and this might prevent the accommodation of the oncoming tray.

The tray can thus arrive and find a space that is insufficient to accommodate it, and this causes its diversion toward the open side of the pouch, ending on the longitudinal heat-sealing bar, causing machine downtimes and waste of time for cleaning the machine.

Finally, it is noted that the return of the air into the bell or vacuum chamber occurs, due to constructive reasons, usually in a region that is far from the heat-sealing bar or coincides with the vacuum hole by means of the use of a three-way valve, but this does not optimize the conveyance of the flow inside the bell.

Heat-sealing machines for preformed trays are also known. In order to use heat-sealing machines, and therefore when it is necessary to change the size of the package to be sealed and then trim the film heat-sealed onto the edge of the tray with a die cutter, the user must intervene by changing at least one mechanical part, commonly known as die.

Such die is constituted by a hot upper element, which is shaped like the tray to be packaged, by a die-cutter, which will follow the edge of the tray in order to cut the film, and by a lower element, which constitutes the receptacle of the tray for heat-sealing and cutting.

The problem that is observed is constituted by the considerable time required to change the die as a function of the shape of the tray to be heat-sealed.

Machines are also known which, in order to give greater flexibility to the system, provide, once the machine has stopped, an automatic changing of the upper element of the die. Such upper element is provided with two or more (up to four) dies which have two or more vacuum chambers which rotate on a horizontal axis.

In this manner, the operator, in order to change the die, must, after stopping the machine, select which die he or she will use and the die will be preheated.

Once the desired temperature has been reached, it is necessary to rotate the upper element, bringing it at the work region, and replace physically the lower element (which must match up exactly with the upper one) in order to be then able to begin work with the new format.

This solution is mechanically very complicated and expensive, and it also has processing downtimes that affect the overall costs of the machine.

Disclosure of the Invention

The aim of the present invention is therefore to solve the above mentioned technical problems, eliminating the drawbacks of the cited background art, by providing a device that makes it possible to achieve vacuum packaging or compensated vacuum or only the sealing of technical products or food products such as sliced ham and salami, meat, cheese in portions, placed in trays of the desired size, rapidly and simply.

Within this aim, an object of the present solution is to provide a device that makes it possible to achieve vacuum packaging or compensated vacuum or only the sealing of products placed in trays of the desired size in short times and without any need for machine stops.

Another object is to provide a device that is structurally simple and can be used even by an operator who is not particularly trained.

Another object is to provide a device that allows optimum heat-sealing of the tray, avoiding machine stops and waste of time for cleaning said machine and replacing the die.

This aim and these objects, as well as others which will become better apparent hereinafter, are achieved by a packaging device, particularly for packaging trays containing food products or technical materials in a controlled atmosphere and by means of a film of plastic material, characterized in that it comprises an upper chamber and a lower chamber, adapted to define a chamber for accommodating a tray, which can be fastened by mutually superimposing them and are each provided internally with a plurality of heat-sealing and/or cutting and/or die-cutting means arranged concentrically, said lower chamber being provided centrally with a plurality of supporting means for said tray.

BRIEF DESCRIPTION OF DRAWINGS

Further characteristics and advantages of the present invention will become better apparent from the detailed description of two particular embodiments, illustrated by way of non-limiting example in the accompanying drawings, wherein.

WAYS OF CARRYING OUT THE INVENTION

Figure 1:
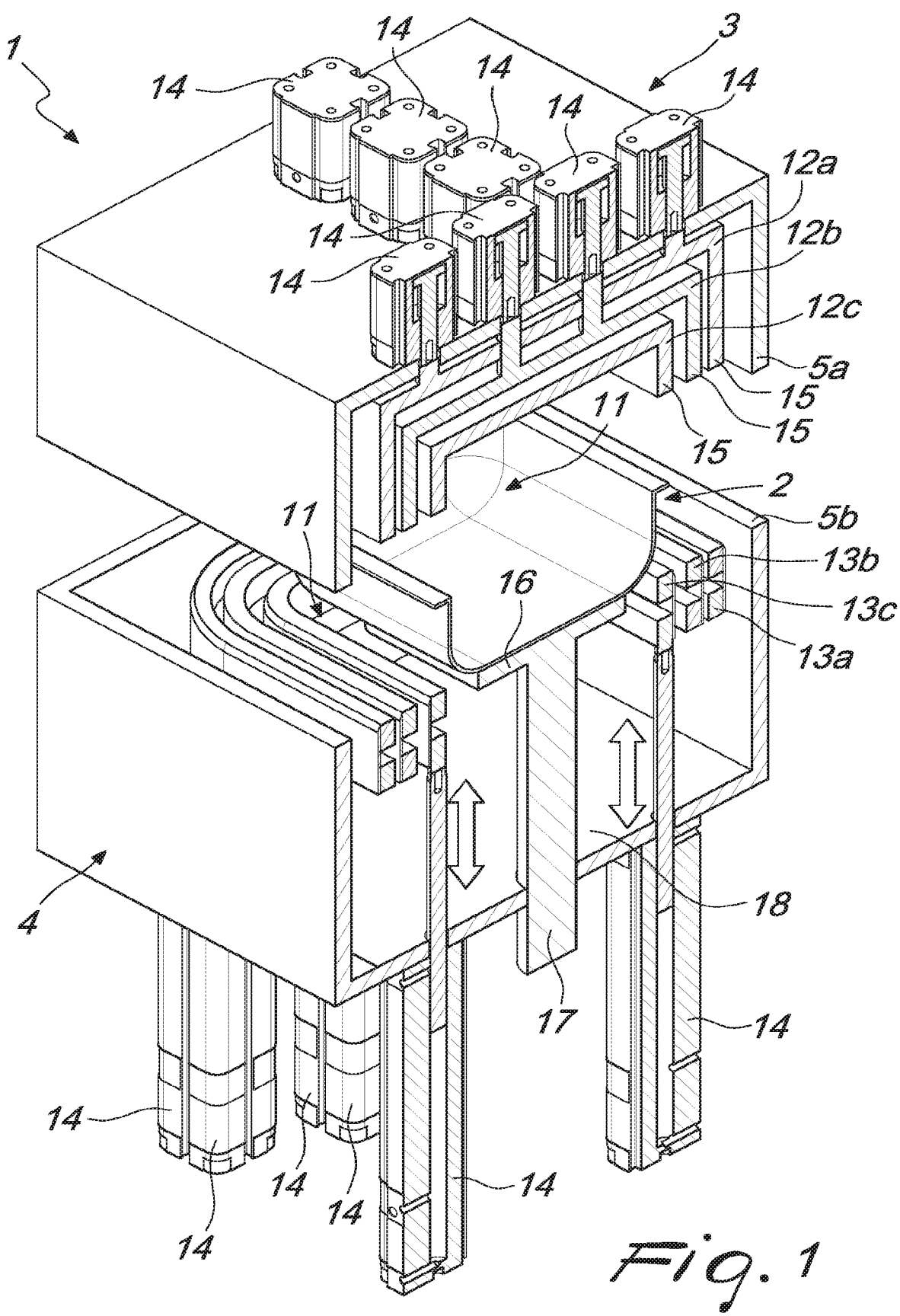
FIG. 1 is a partially sectional lateral perspective view of the device without the supporting roller for the film.
Figure 2:
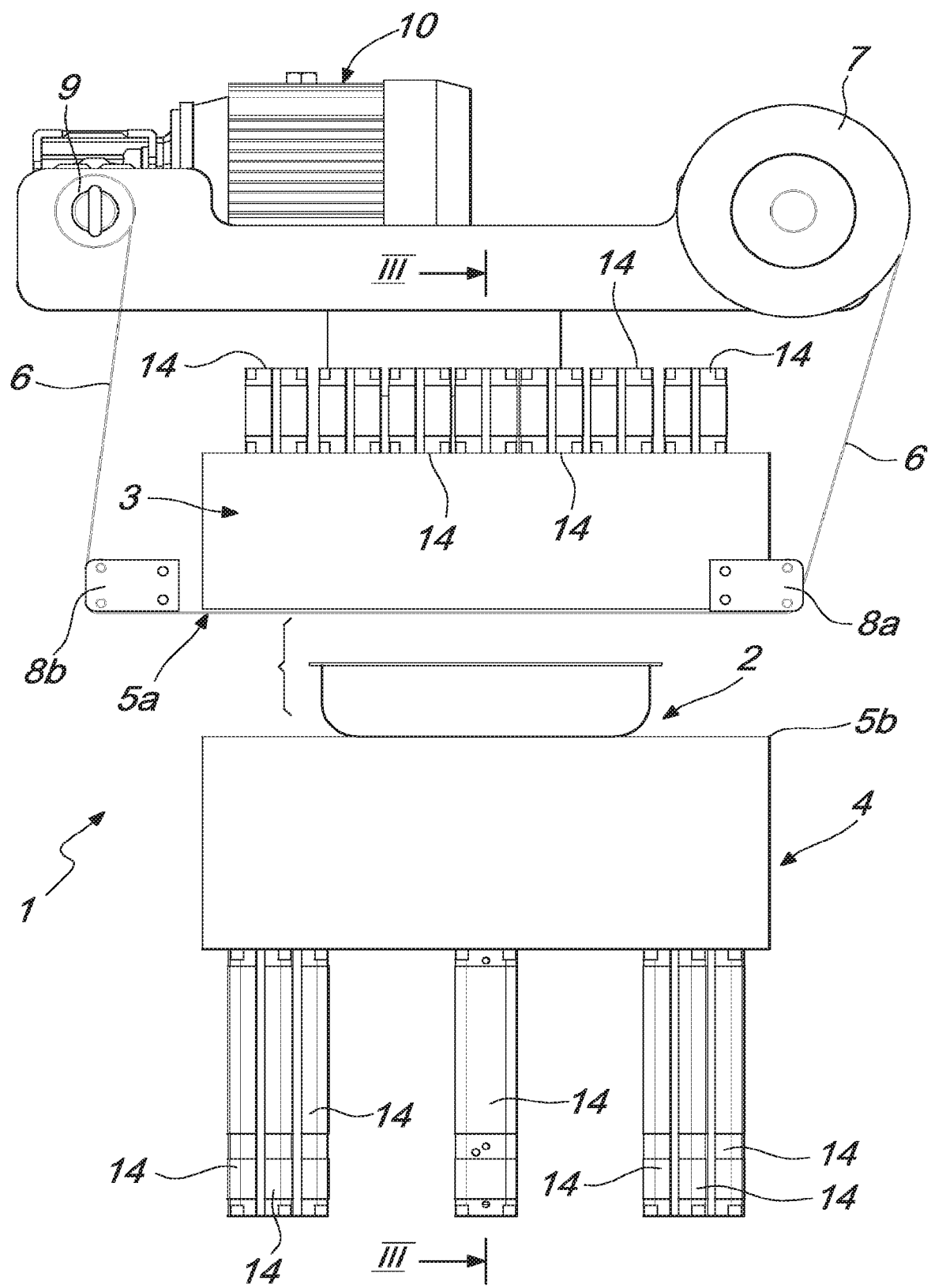
FIG. 2 is a first side view of the device.

In the exemplary embodiments that follow, individual characteristics, given in relation to specific examples, may actually be interchanged with other different characteristics that exist in other exemplary embodiments.

With reference to the figures, the reference numeral 1 designates a device for the packaging particularly of technical materials or food products placed within an adapted tray 2.

The device 1 comprises an upper chamber 3 and a lower chamber 4 which are shaped like a vacuum bell, each being constituted essentially by a container that can be fastened onto the other one hermetically by superimposing.

Known means, not shown, are also present which are suitable to obtain, within the upper chamber 3 and the lower chamber 4, a controlled atmosphere or a vacuum.

Adapted bands or gaskets for airtightness, not shown, are provided perimetrically to the lateral edge 5a, 5b of the upper chamber 3 and of the lower chamber 4.

The device preferably uses a film 6 made of plastic material, which is unwound from an adapted roll which is associated in an upper region and at one side of the upper chamber 3 and then guided on adapted pairs of guiding elements 8a, 8b which are present proximate to the lateral edges 5a, 5b of the upper chamber 3 and of the lower chamber 4.

The film 6 is then rewound onto a winder which is operated by an adapted first motor 10 which is arranged laterally to the upper chamber 3.

Heat-sealing and/or cutting and/or die-cutting means are provided inside each one of the upper chamber 3 and of the lower chamber 4 and are arranged concentrically within the chambers so as to define internally and centrally a free space 11 onto which the tray 2 is to be made to act.

The heat-sealing and/or cutting and/or die-cutting means are composed of a series of upper pressers 12a, 12b, 12c, which are inserted in each other, are arranged mutually coaxially within the upper chamber 3 and are provided with heat-sealing and/or cutting and/or die-cutting systems.

In the particular embodiment, the upper pressers are three in number but their number might vary according to specific requirements.

The heat-sealing and/or cutting and/or die-cutting means also comprise a series of lower pressers 13a, 13b, 13c, which are arranged so as to be inserted in each other coaxially within the lower chamber 4 and are arranged, with respect to the upper pressers 12a, 12b, 12c, so as to correspond respectively to the upper pressers.

The upper pressers 12a, 12b, 12c and the lower pressers 13a, 13b, 13c can thus move vertically because they are actuated by adapted actuators 14 such as pneumatic cylinders which are arranged preferably above the upper chamber 3 and below the lower chamber 4.

As an alternative, only the upper pressers 12a, 12b, 12c or only the lower pressers 13a, 13b, 13c can be movable.

In the particular embodiment shown, the upper pressers 12a, 12b, 12c are box-shaped, with a height that corresponds to a particular tray 2 to be heat-sealed. The lower pressers 13a, 13b, 13c are instead constituted by concentric rings of the same height, whose function is to abut against the perimetric edges of the corresponding and overlying upper pressers 12a, 12b, 12c.

Figure 11:
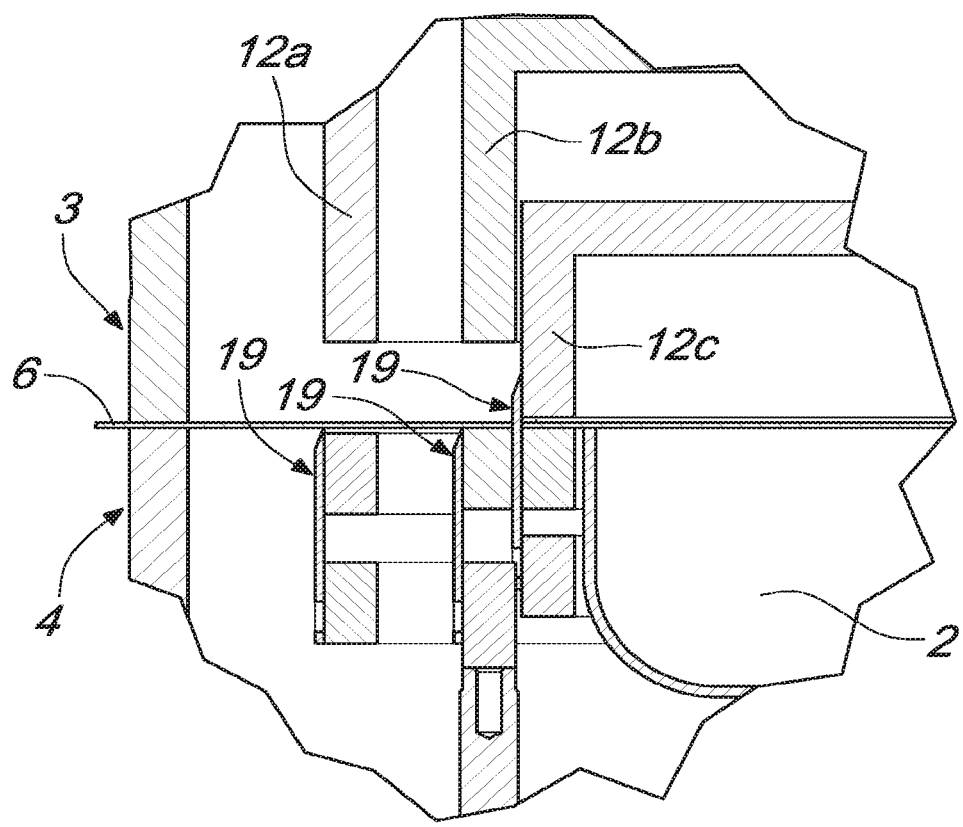
FIG. 11 is a view of the device in a detail shown in FIG. 8.

The lower pressers 13a, 13b, 13c are further provided, at the lateral edges that are adjacent to the end that faces the upper pressers 12a, 12b, 12c, with blades 19 which are adapted to allow the cutting of the film 6 during the work cycle, as shown in FIG. 11.

At the free space 11 a plane 16 is provided, which can move vertically with respect to the lower chamber 4 by means of an adapted shaft 17 which can slide with respect to the footing 18 of the lower chamber 4.

The support for the tray 2 can be advantageously of the spring-loaded type.

Use of the invention is as follows.

The arrangement of the upper pressers 12a, 12b, 12c and of the lower pressers 13a, 13b, 13c, so that the former are concentrical to the latter or at least the former are contained in the latter, enables to predefine the type of tray to be used, achieving the heat-sealing and cutting of the film 6 rapidly and simply.

Beforehand, the operator does not have to select in any way which tray he or she wishes to package, but simply rests the tray of the desired size in an adapted loading area, centering it with respect to the loading plane 16 of the device 1.

As an alternative, it is possible to provide an automatic means for the centering of the tray 2 before sending it to the device 1.

Figure 3:
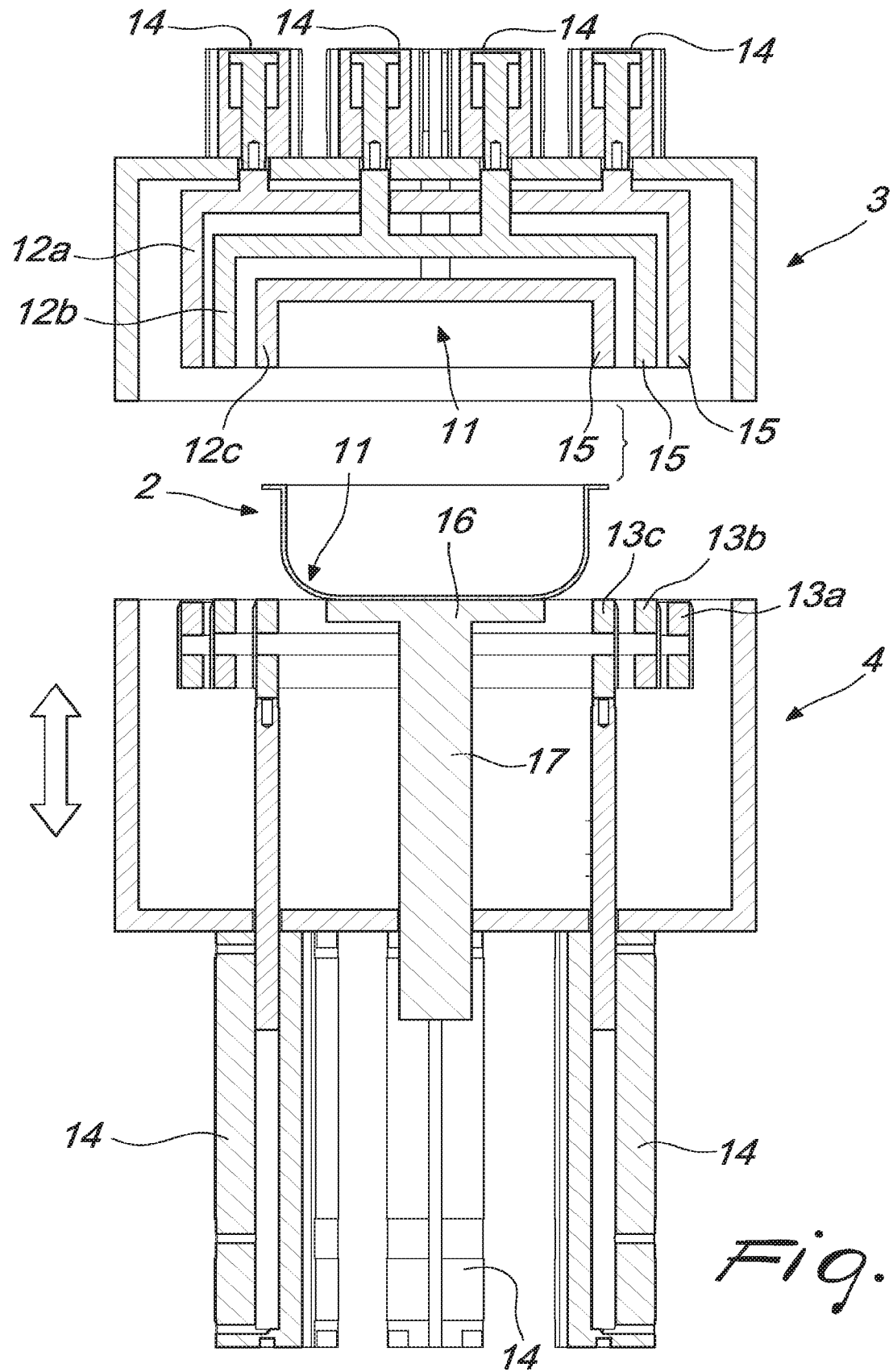
FIG. 3 is a sectional view, taken along the line III-III of FIG. 2.
Figure 4:
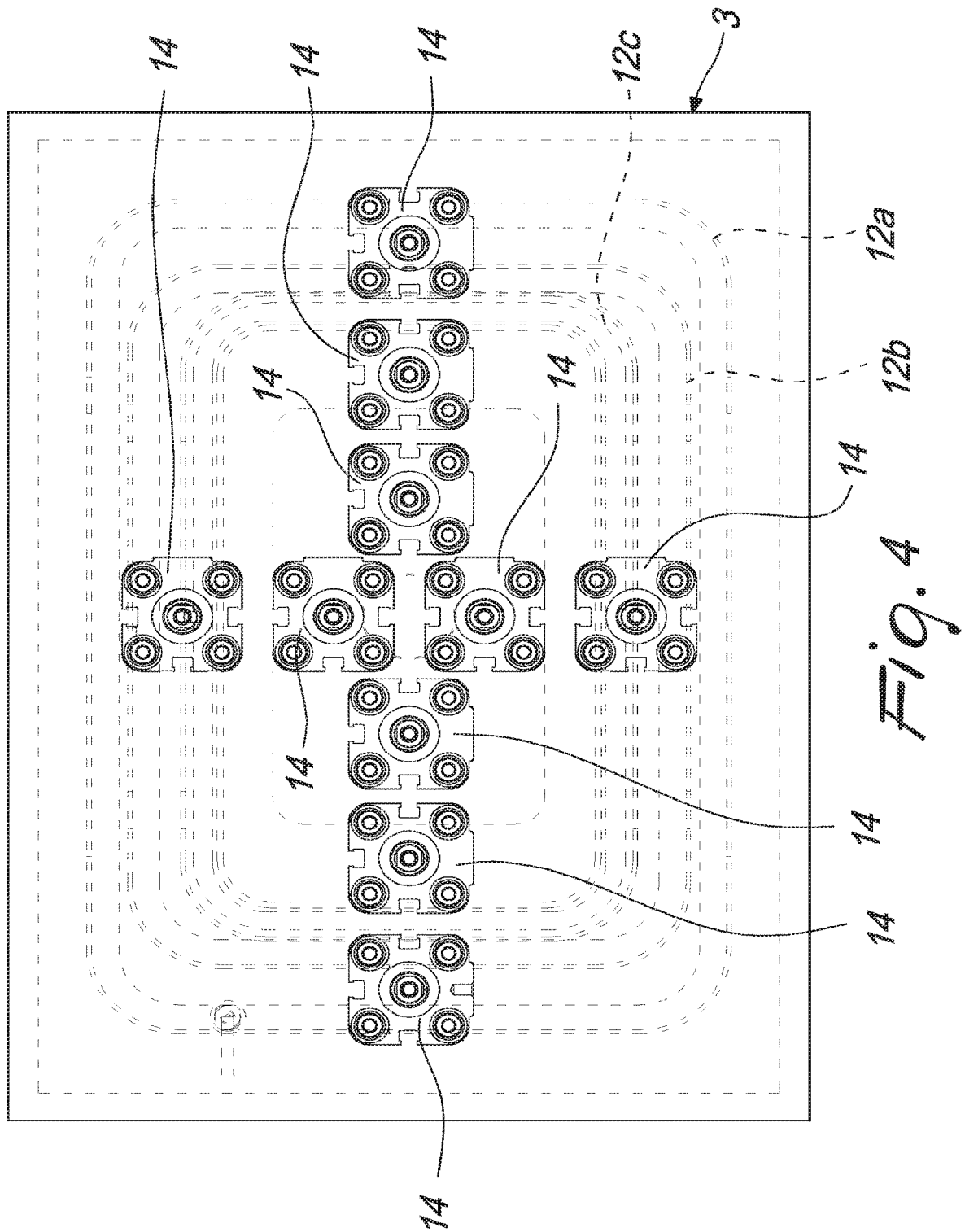
FIG. 4 is a top view of the device.
Figure 5:
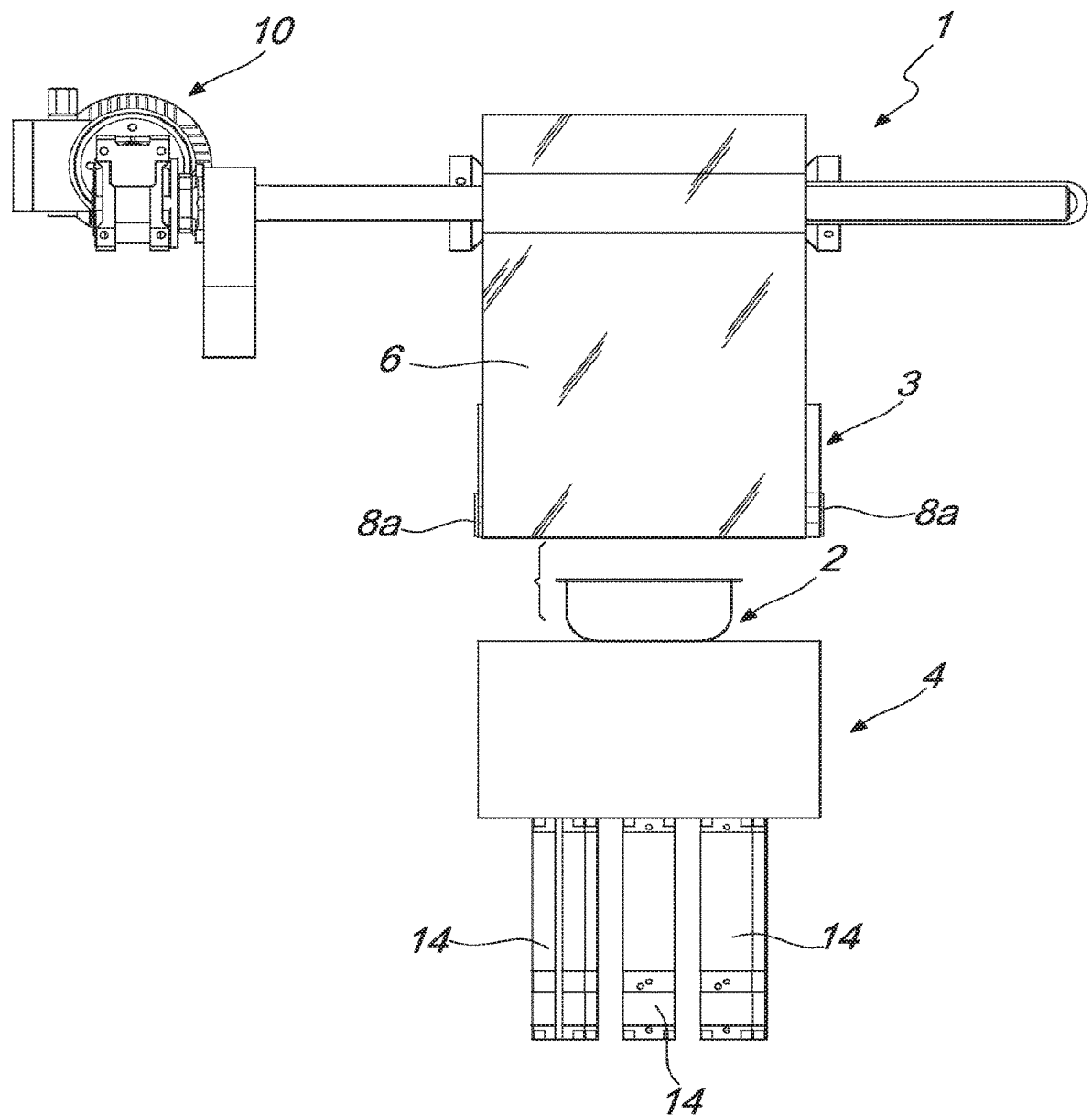
FIG. 5 is a second side view of the device.

At this point the tray can be inserted, manually or by means of an adapted fixed-stroke pusher, in its position inside the device 1 and thus be positioned on the plane 16, as shown in FIG. 3.

The loading system brings it, by means of a movement unit, to a sizing/centering system. Once the system has recognized the size of the tray, the tray is placed automatically, by way of a movement system, at the center of its lower loading region and at the same time the film performs an advancement which is suitable for the type of tray to be heat-sealed.

Figure 6:
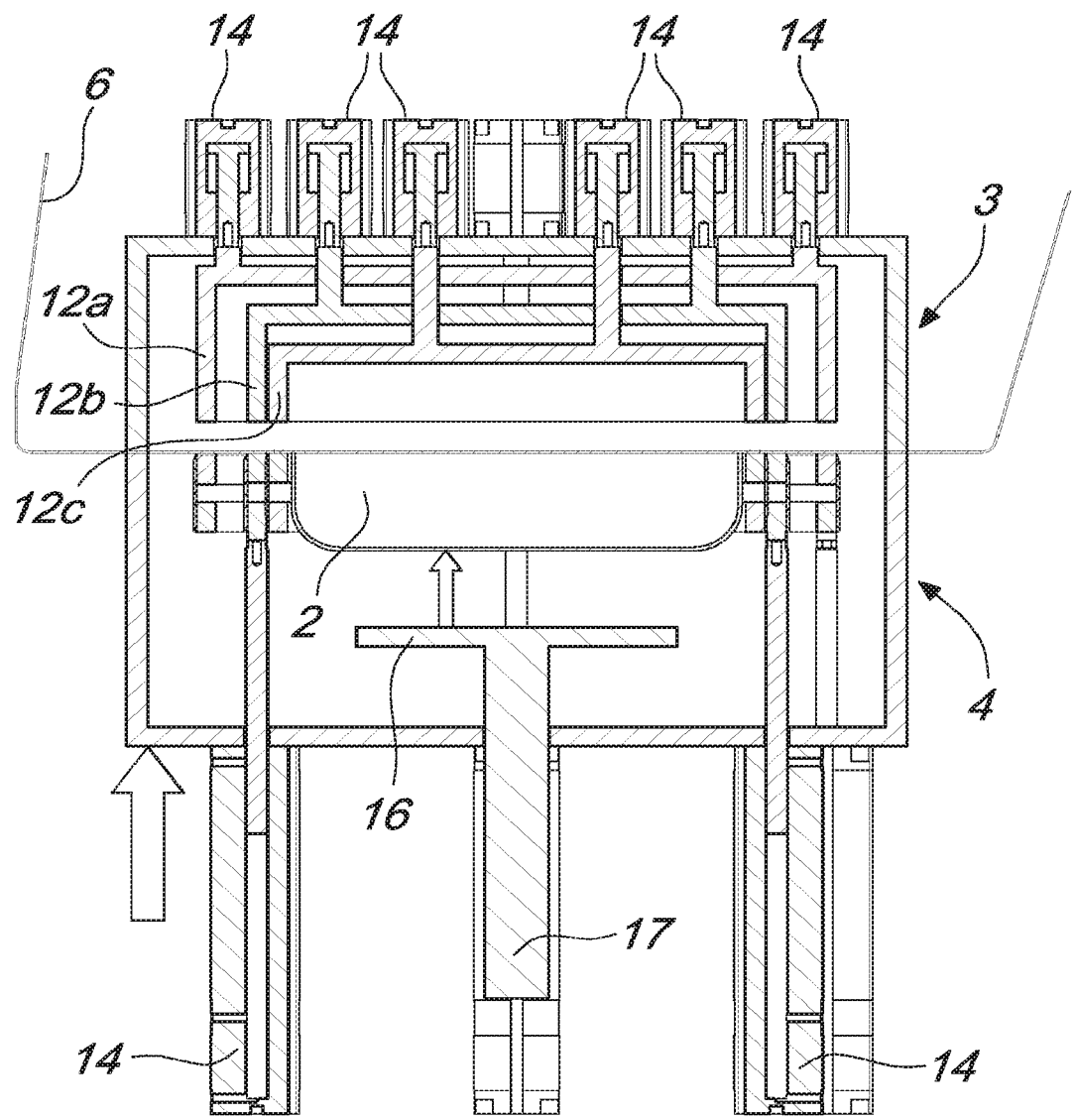
FIGS. 6 to 10 are sectional views of the operation of the device.
Figure 7:
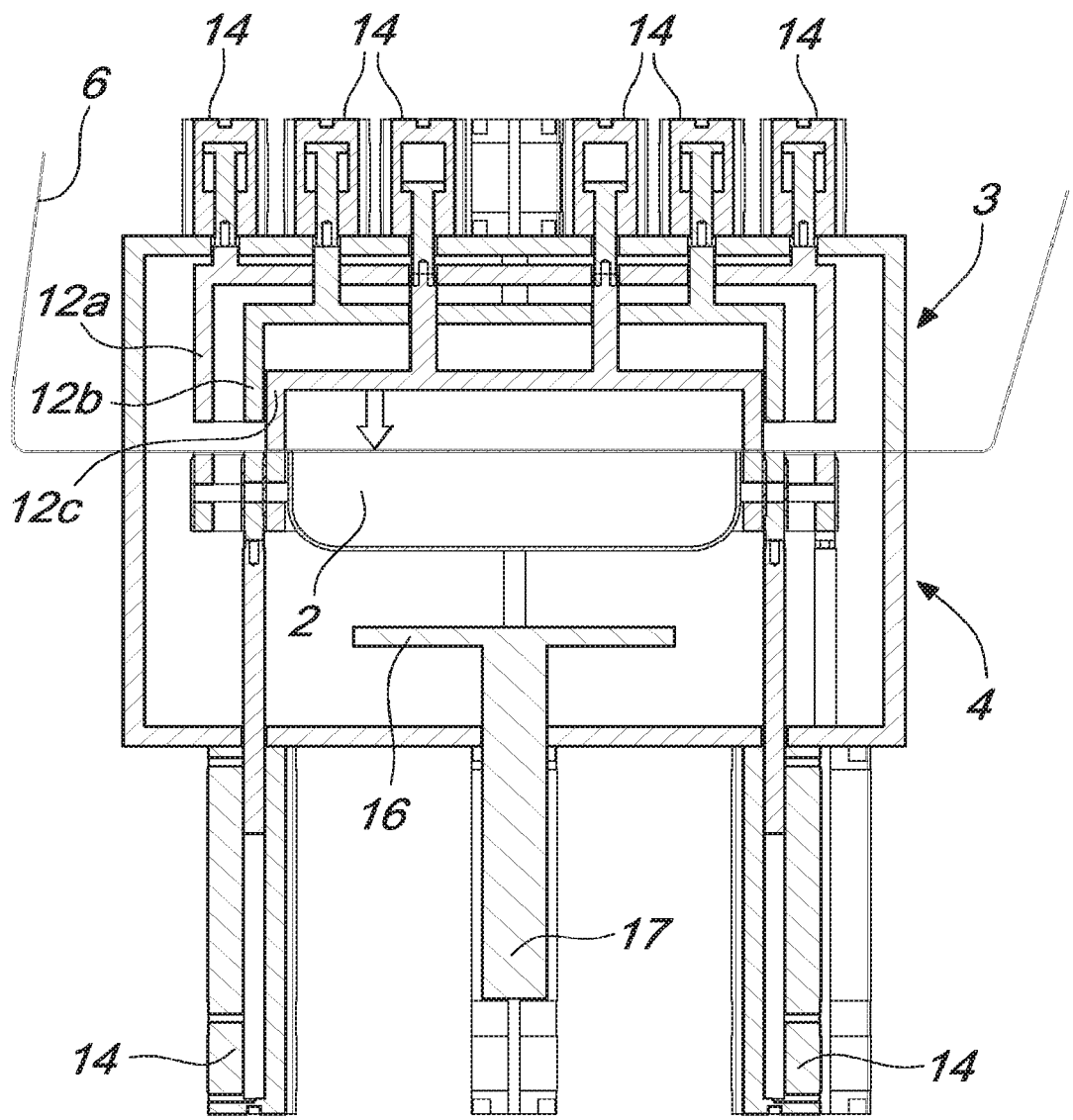
Figure 8:
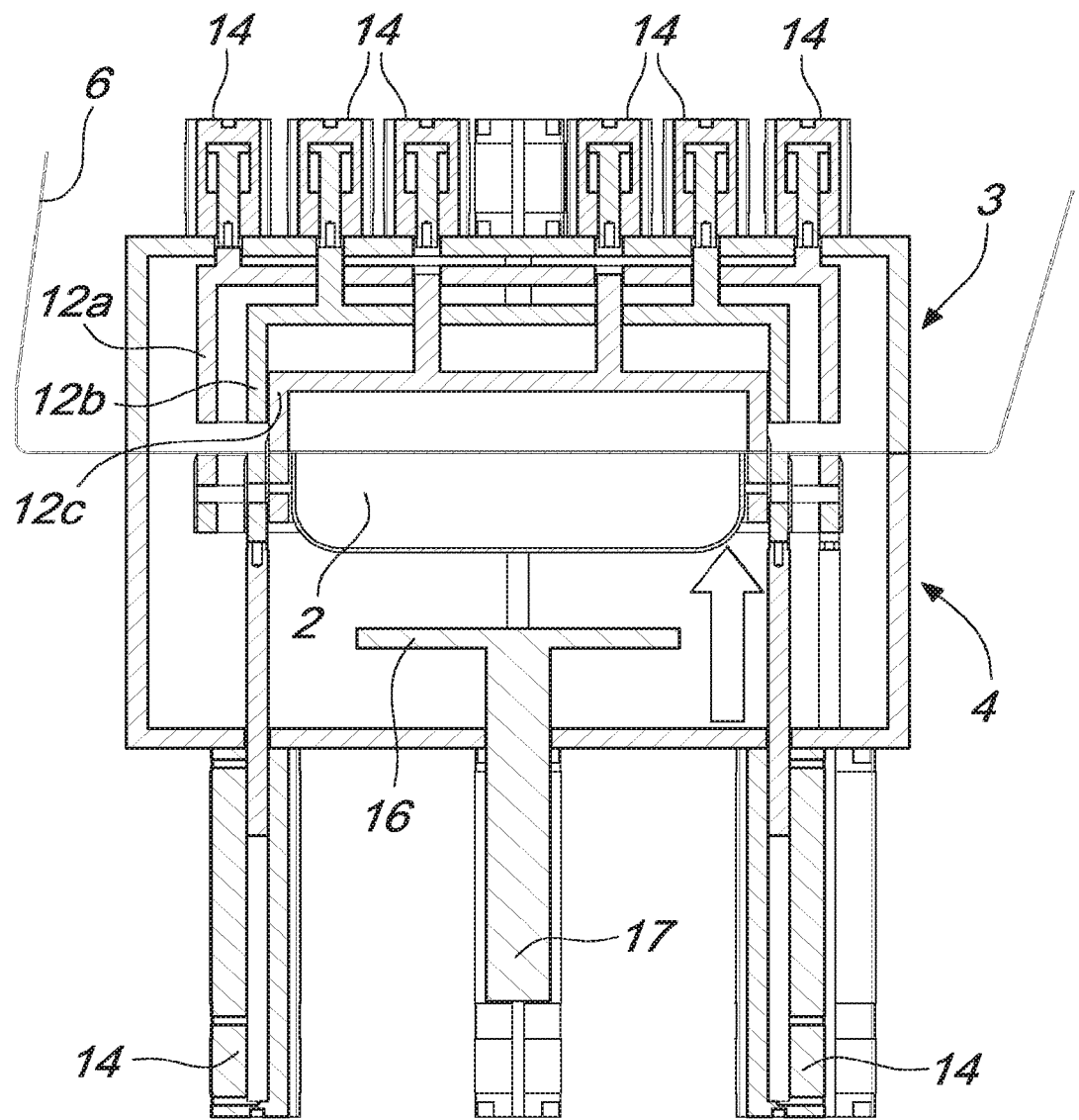

At this point the upper chamber 3 and the lower chamber 4 close, the latter rising (see FIG. 6), and at the same time the desired one among the upper pressers 12a, 12b, 12c (see FIG. 7 for the upper presser 12c) and the corresponding one among the lower pressers 13a, 13b, 13c) (see FIG. 8) are moved vertically.

The vacuum or gas vacuum cycle, for example, can thus start, and at its end the heat-sealing and cutting step begins, performed by utilizing the upper and lower pressers (see for example FIG. 8, in which the blade 19 of the lower presser 13c has risen and cuts the film along the edge of the tray 2), or by means of a mechanical system or a system of another known type, which applies pressure onto an adapted heat-sealing block which corresponds to the tray and heat-seals and cuts the film onto the tray.

Figure 9:
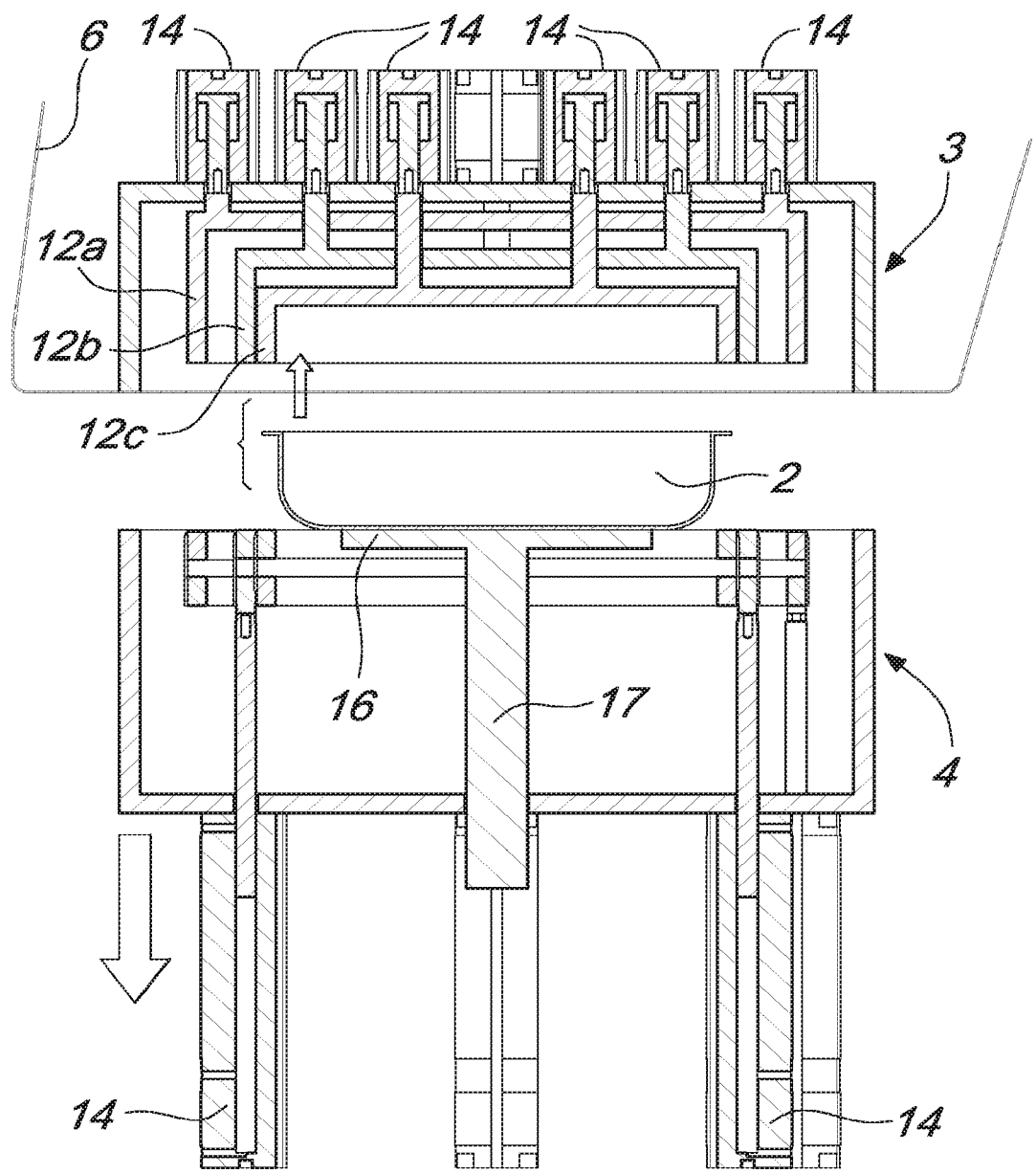
Figure 10:
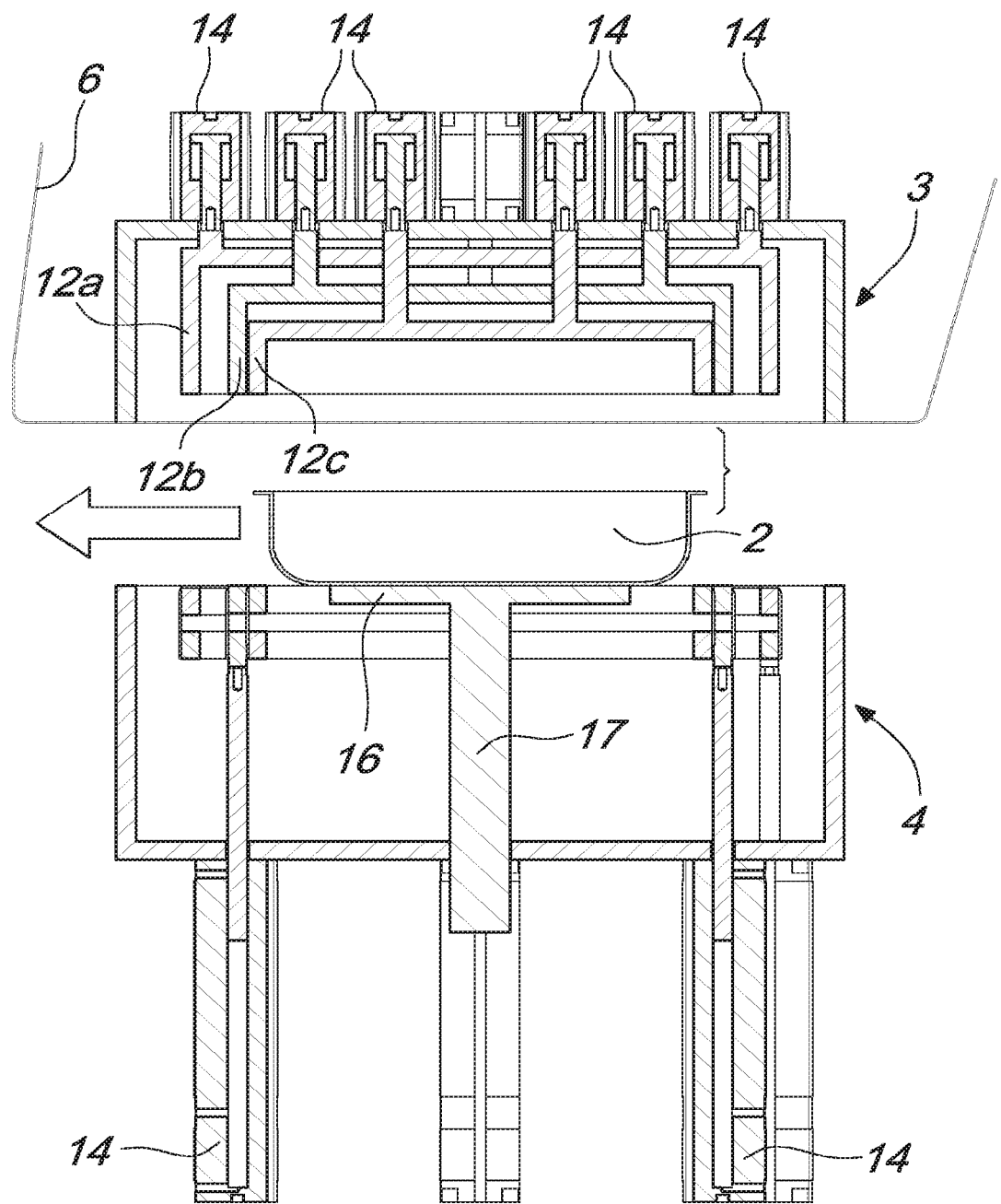

Once this step has ended, the vacuum chamber opens (see FIG. 9, in which the upper presser 12c has also risen and the lower chamber 4 has descended) and the lower pressers 13a, 13b, 13c descend and the plane 16 rises until the tray 2 that has just been sealed is brought to the unloading level in order to proceed with a new process (see FIG. 10).

As has been shown, the practicality of use of being able to load the tray in the desired format at each cycle has been achieved, the tray being heat-sealed and die-cut without the need for any intervention on the part of the operator.

The device 1 obviously comprises, for heat-sealing and cutting, means adapted to activate the upper pressers 12a, 12b, 12c and the lower pressers 13a, 13b, 13c depending on the size of the tray 2 of the chosen size.

FIGS. 3, 6, 7, 8, 9 and 10 illustrate the operation of the device.

It has thus been found that the invention has achieved the intended aim and objects, a device having been obtained which makes it possible to achieve vacuum packaging or compensated vacuum or only the heat-sealing of technical products or food products such as sliced ham and salami, meat, cheese in portions, placed in trays of the desired size, rapidly and simply without the need for any machine stops.

Moreover, the device is structurally simple and can be used even by an operator who is not particularly trained.

The invention is of course susceptible of numerous modifications and variations, all of which are within the scope of the appended claims.

Thus, for example, it is also possible to load two trays simultaneously and double the production.

Alternatively, it is possible to have a die-cutter system which is anchored to the upper chamber 3 or to the lower chamber 4 or a system for centering the part by means of mechanical or electrochemical positioning units.

The shape and number of the upper pressers 12a, 12b, 12c and of the lower pressers 13a, 13b, 13c of course may be the most disparate according to the specific requirements.

Conveniently, it is possible to provide for the presence not only of the above mentioned centering means, but also of means for recognizing the type of tray, adapted to recognize the tray on the basis of its dimensions or of a code that is present on the tray itself.

Advantageously, the recognition means can comprise a vision system. As a further alternative, it is possible to provide, at the upper chamber, a plurality of heat-sealing and/or cutting and/or die-cutting means, in a manner similar to what has been described above, but with the difference that such heat-sealing and/or cutting and/or die-cutting means are fixed.

Therefore, differently from the first embodiment, the heat-sealing and/or cutting and/or die-cutting occurs exclusively by moving the lower chamber toward the upper chamber, without actuating for lowering the individual heat-sealing and/or cutting and/or die-cutting means of the upper chamber.

Essentially, in this second embodiment there are no presser means at the upper chamber.

The film used can be both of the single-folded type and of the flat sheet type.

The materials used, as well as the dimensions that constitute the individual components of the invention, may of course be more pertinent according to specific requirements.

The various means for performing certain different functions need not certainly coexist only in the illustrated embodiment, but can be present per se in many embodiments, including ones that are not illustrated.

The characteristics indicated as advantageous, convenient or the like may also be omitted or be replaced with equivalents.

The disclosures in Italian Patent Application no. TV2010A000164, from which this application claims priority, are incorporated herein by reference.

Where technical features mentioned in any claim are followed by reference signs, those reference signs have been included for the sole purpose of increasing the intelligibility of the claims and accordingly such reference signs do not have any limiting effect on the interpretation of each element identified by way of example by such reference signs.

The invention claimed is:

1. A packaging device, for packaging trays containing food products or technical materials in a controlled atmosphere and by means of an unwound film of plastic material, the device comprising:
a roll adapted to unwind said film;
a winder to rewind said film;
an upper chamber and a lower chamber, adapted to define a chamber for accommodating a tray;
said upper chamber and said lower chamber being arranged to be fastened by mutual and vertical superimposition and being each provided internally with a plurality of heat-sealing and/or cutting and/or die-cutting means arranged concentrically, said lower chamber being provided centrally with supporting means for said tray;
said supporting means being vertically movable;
said plurality of heat-sealing and/or cutting and/or die-cutting means of said upper chamber comprising a series of upper pressers arranged concentrically, said series of upper pressers being movable in respect to the upper chamber;
said plurality of heat-sealing and/or cutting and/or die-cutting means of said lower chamber comprising a series of lower pressers corresponding to said upper pressers;
said lower pressers comprising blades adapted to cut said film during a work cycle of the device.

2. The device according to claim 1, wherein said film of plastic material is unwound from an adapted roll, which is associated in an upper region and at one side of said upper chamber and then guided on pairs of guides which are present proximate to said lateral edges of said upper chamber and of said lower chamber, said film being then rewound on said winder which is controlled by a first motor arranged laterally to said upper chamber.

3. The device according to claim 1, wherein heat-sealing and/or cutting and/or die-cutting means are arranged inside each one of said upper chamber and said lower chamber and are arranged concentrically within said chambers so as to define internally and centrally a free space.

4. The device according to claim 3, wherein at said free space a plane is provided, which can move vertically with respect to said lower chamber by means of an adapted shaft, which slides with respect to the footing of said lower chamber.

5. The device according to claim 1, wherein said series of upper pressers is three in number and said series of lower pressers is three in number.

6. The device according to claim 1, wherein said lower pressers are arranged coaxially within said lower chamber.

7. The device according to claim 1, wherein said upper pressers are, individually or together or alternately, movable vertically and controlled by actuators.

8. The device according to claim 1, wherein said film is of the flat sheet type.

9. The device according to claim 1, wherein the device further comprises means adapted to activate said upper pressers and said lower pressers depending on a size of a tray to be sealed.

10. The device according to claim 1, wherein said plurality of heat-sealing and/or cutting and/or die-cutting means of said upper chamber is a plurality of cutting and/or die-cutting means.

11. The device according to claim 10, wherein said plurality of heat-sealing and/or cutting and/or die-cutting means of said lower chamber is a plurality of cutting and/or die-cutting means.

12. The device according to claim 1, wherein said plurality of heat-sealing and/or cutting and/or die-cutting means of said lower chamber is a plurality of cutting and/or die-cutting means.

13. The device according to claim 1, said series of lower pressers being movable in respect to the lower chamber.

14. The device according to claim 1, wherein said lower pressers comprise concentric rings of equal height, said concentric rings configured to abut against perimetric edges of the corresponding upper pressers.

15. The device according to claim 1, said lower pressers being constituted by concentric rings of equal height, whose function is to abut against perimetric edges of the corresponding and overlying upper pressers, said lower pressers being provided, at the lateral edges that are adjacent to the end that faces said upper pressers, with blades which are adapted to allow the cutting of said film during a work cycle.

16. The device according to claim 1, wherein said upper pressers are, individually or together or alternately, movable vertically and controlled by actuators.

17. The device according to claim 1, wherein the device further comprises means adapted to activate said upper pressers and said lower pressers depending on a size of a tray to be sealed.

18. The device according to claim 1, said series of lower pressers being movable in respect to the lower chamber.

19. A packaging method for packaging trays containing food products or technical materials in a controlled atmosphere and by means of a film of plastic material, using a device according to claim 1, wherein the method comprises:
positioning a tray, by centering said tray at a support which is arranged at said lower chamber, in a position below said upper chamber;
fastening said lower and upper chambers by mutual superimposition; and
actuating one of said upper pressers or said lower pressers selected to correspond to the dimensions of said tray.

20. The method according to claim 19, further comprising a step of recognizing automatically a size of said tray prior to said step of fastening of said lower and upper chambers by mutual superimposition, and prior to said step of actuating said upper presser or lower presser selected to correspond to the dimensions of said tray.

21. A packaging device, for packaging trays containing food products or technical materials in a controlled atmosphere and by means of an unwound film of plastic material, the device comprising:
a roll adapted to unwind said film;
a winder to rewind said film;
an upper chamber and a lower chamber, adapted to define a chamber for accommodating a tray;
said upper chamber and said lower chamber being arranged to be fastened by mutual and vertical superimposition and being each provided internally with a plurality of heat-sealing and/or cutting and/or die-cutting means arranged concentrically, said lower chamber being provided centrally with supporting means for said tray;
said supporting means being vertically movable;

said plurality of heat-sealing and/or cutting and/or die-cutting means of said upper chamber comprising a series of upper pressers arranged concentrically, said series of upper pressers being movable in respect to the upper chamber;

said plurality of heat-sealing and/or cutting and/or die-cutting means of said lower chamber comprising a series of lower pressers corresponding to said upper pressers;

wherein said plurality of heat-sealing and/or cutting and/or die-cutting means of said lower chamber is a plurality of cutting and/or die-cutting means.

22. The device according to claim 21, wherein said upper pressers are, individually or together or alternately, movable vertically and controlled by actuators.

23. The device according to claim 21, wherein the device further comprises means adapted to activate said upper pressers and said lower pressers depending on a size of a tray to be sealed.

24. The device according to claim 21, said series of lower pressers being movable in respect to the lower chamber.

25. A packaging device, for packaging trays containing food products or technical materials in a controlled atmosphere and by means of an unwound film of plastic material, the device comprising:

a roll adapted to unwind said film;
a winder to rewind said film;
an upper chamber and a lower chamber, adapted to define a chamber for accommodating a tray;

said upper chamber and said lower chamber being arranged to be fastened by mutual and vertical superimposition and being each provided internally with a plurality of heat-sealing and/or cutting and/or die-cutting means arranged concentrically, said lower chamber being provided centrally with supporting means for said tray;

said supporting means being vertically movable;

said plurality of heat-sealing and/or cutting and/or die-cutting means of said upper chamber comprising a series of upper pressers arranged concentrically, said series of upper pressers being movable in respect to the upper chamber;

said plurality of heat-sealing and/or cutting and/or die-cutting means of said lower chamber comprising a series of lower pressers corresponding to said upper pressers;

said lower pressers being constituted by concentric rings of equal height, whose function is to abut against perimetric edges of the corresponding and overlying upper pressers, said lower pressers being provided, at the lateral edges that are adjacent to the end that faces said upper pressers, with blades which are adapted to allow the cutting of said film during a work cycle.

* * * * *